United States Patent
Martinez Canedo et al.

(10) Patent No.: US 10,281,892 B2
(45) Date of Patent: May 7, 2019

(54) PIPELINING FOR CYCLIC CONTROL SYSTEMS

(71) Applicant: Siemens Corporation, Orlando, FL (US)

(72) Inventors: Arquimedes Martinez Canedo, Princeton, NJ (US); Livio Dalloro, Princeton, NJ (US); Hartmut Ludwig, West Windsor, NJ (US)

(73) Assignee: Siemens Aktiengesellschaft, Munich (DE)

( * ) Notice: Subject to any disclaimer, the term of this patent is extended or adjusted under 35 U.S.C. 154(b) by 540 days.

(21) Appl. No.: 14/419,041

(22) PCT Filed: Jul. 26, 2013

(86) PCT No.: PCT/US2013/052160
§ 371 (c)(1),
(2) Date: Feb. 2, 2015

(87) PCT Pub. No.: WO2014/022203
PCT Pub. Date: Feb. 6, 2014

(65) Prior Publication Data
US 2015/0168936 A1 Jun. 18, 2015

Related U.S. Application Data

(60) Provisional application No. 61/678,736, filed on Aug. 2, 2012.

(51) Int. Cl.
*G05B 19/042* (2006.01)
*G06F 9/48* (2006.01)
*G06F 9/52* (2006.01)

(52) U.S. Cl.
CPC ....... *G05B 19/0421* (2013.01); *G06F 9/4887* (2013.01); *G05B 2219/1202* (2013.01);
(Continued)

(58) Field of Classification Search
CPC .................. G06F 1/32; G05B 19/0421; G05B 2219/1202
See application file for complete search history.

(56) References Cited

U.S. PATENT DOCUMENTS

2005/0097509 A1* 5/2005 Rong .................... G06F 8/4452
717/106
2005/0188364 A1* 8/2005 Cockx .................... G06F 8/456
717/159
(Continued)

FOREIGN PATENT DOCUMENTS

CN 101149690 A 3/2008
CN 101369240 A 2/2009
(Continued)

OTHER PUBLICATIONS

Arquimedes Canedo, et al. "Towards Parallel Execution of IEC 61131 Industrial Cyber-Physical Systems Applications". In Design, Automation & Test in Europe, Mar. 12, 2012 (4 Pages).
(Continued)

*Primary Examiner* — Phil Nguyen

(57) ABSTRACT

A method of managing a control system includes: executing a first iteration of a program in a first processor core of a multi-core computer system during a first period (S1501), executing a second iteration of the program in a second processor core of the multi-core system during a second period that overlaps the first period (S1502); and using outputs of the iterations to control the control system (S1503).

8 Claims, 19 Drawing Sheets

(52) U.S. Cl.
CPC ........ *G05B 2219/1205* (2013.01); *G06F 9/52* (2013.01); *G06F 2209/483* (2013.01)

(56) References Cited

U.S. PATENT DOCUMENTS

| | | | |
|---|---|---|---|
| 2008/0077793 A1* | 3/2008 | Tan | G06F 21/56 713/168 |
| 2009/0240860 A1 | 9/2009 | Mills | |
| 2009/0285228 A1* | 11/2009 | Bagepalli | H04L 45/38 370/412 |
| 2009/0307467 A1* | 12/2009 | Faraj | G06F 9/54 712/225 |
| 2010/0106758 A1* | 4/2010 | Govindaraju | G06F 17/142 708/404 |
| 2010/0289834 A1* | 11/2010 | Lee | G09G 3/3607 345/690 |
| 2011/0103711 A1* | 5/2011 | Su | G06T 1/20 382/276 |
| 2011/0209153 A1* | 8/2011 | Suzuki | G06F 9/5038 718/102 |
| 2011/0292830 A1* | 12/2011 | Yanggratoke | H04L 47/10 370/253 |
| 2012/0233486 A1* | 9/2012 | Phull | G06F 9/5083 713/375 |
| 2014/0109069 A1* | 4/2014 | Lee | G06F 8/41 717/149 |
| 2014/0165077 A1* | 6/2014 | Martinez Canedo | G06F 8/451 718/105 |

FOREIGN PATENT DOCUMENTS

| | | |
|---|---|---|
| CN | 101556543 A | 10/2009 |
| CN | 101981529 A | 2/2011 |
| JP | 2009230757 A | 10/2009 |
| KR | 20080027006 A | 3/2008 |

OTHER PUBLICATIONS

Marco Paolieri, et al. "A Software-Pipelined Approached to Multicore Execution of Timing Predictable Multi-Threaded Hard Real-Time Tasks". In 2011 14th IEEE International Symposium on Object/Component/Service-Oriented Real-Time Distributed Computing, Mar. 28, 2011 (pp. 233-240).

Alban Douillet, et al. "Software-Pipelining on Multi-Core Architectures". In 16th International Conference on Parallel Architecture and Compilation Techniques, Sep. 1, 2007 (pp. 39-48).

Neil Vachharajani, et al. "Speculative Decoupled Software Pipelining". In 16th International Conference on Parallel Architecture and Compilation Techniques. Sep. 1, 2007 (pp. 49-59).

SIMATIC-Isochrone Mode—Function Manual. Mar. 1, 2006. Retrieved from the Internet: URL: http//cache.automation.siemens.con/dn1/TA/TAxODY10QAA_15218045_HB/S7Takts_e.pdf (74 Pages).

Report of Examination; Chinese Application No. 201380048711.X; Filing Date: Jul. 26, 2013; 14 pages.

* cited by examiner

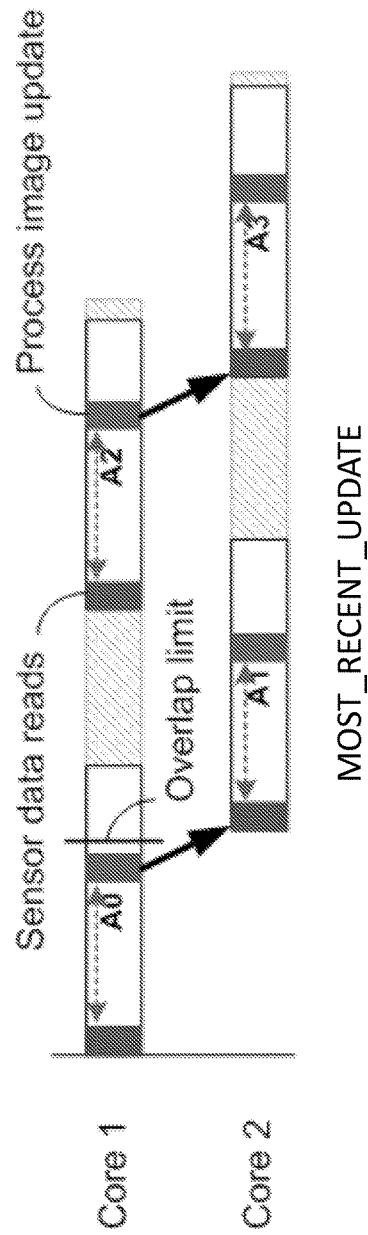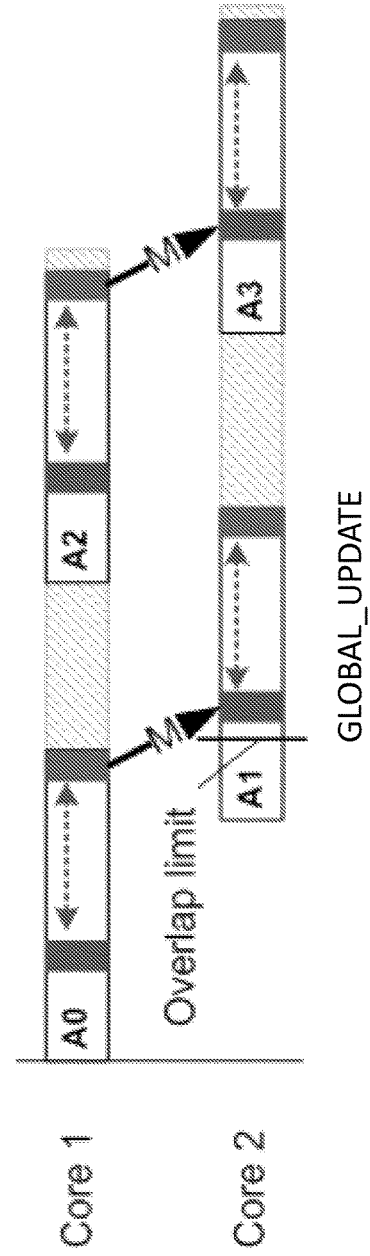
FIG. 13A
FIG. 13B

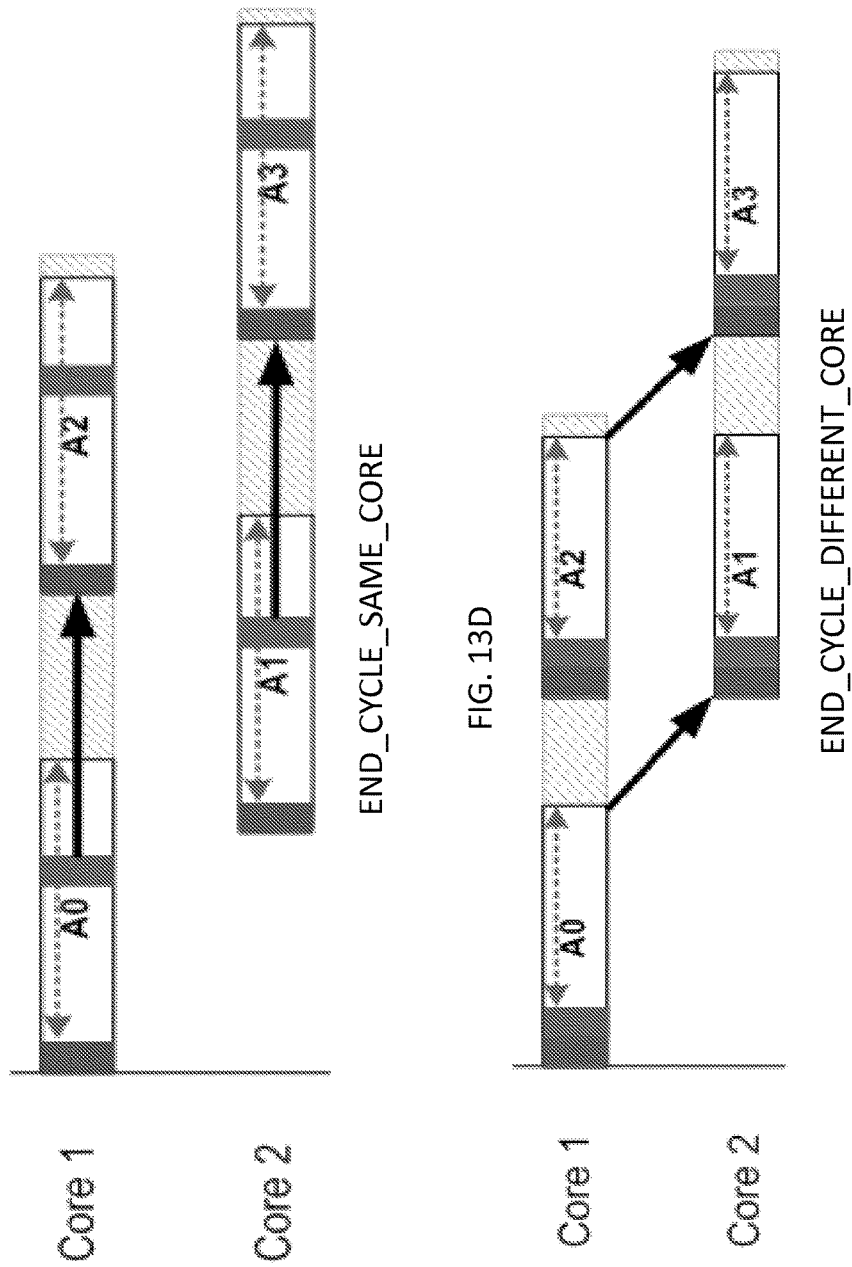

PIPELINING FOR CYCLIC CONTROL SYSTEMS

CROSS-REFERENCE TO RELATED APPLICATIONS

This application claims priority to U.S. Provisional Application No. 61/678,736 filed on Aug. 2, 2012, the disclosure of which is incorporated by reference herein.

BACKGROUND

1. Technical Field

The present disclosure generally relates cyclic control systems, and more particularly to pipelining techniques to improve execution of cyclic control systems.

2. Discussion of Related Art

Cyclic control systems are hard real-time systems designed to interact with a control physical processes through sensors and actuators in pharmaceutical, manufacturing, energy, and automotive industries. Inspired by control and information theory, most cyclic control systems execute applications periodically (cyclically). The scan cycle time (also known as the sampling rate) refers to the period in which the system is expected to (1) read the state of the system under control, (2) compute the corrections to bring the system to the desired state, and (3) send the corrective commands Historically, cyclic control system took advantage of faster uni-processors to execute more functionality in software and to reduce the scan cycle times for the benefit of the control algorithms. Because the entire workload of the application has been executed in a single CPU, sophisticated pre-emptive scheduling algorithms had been developed to guarantee real-time response of these systems. Embedded processor makers are pushing multi-core technology to the industrial automation domain. This has triggered opportunities for researchers and practitioners to explore the benefits of performance, energy efficiency, scalability, consolidation, and redundancy provided by multi-core cyclic control systems.

BRIEF SUMMARY

According to an exemplary embodiment of the invention, a method of managing a control system includes: executing a first iteration of a program in a first processor core of a multi-core computer system during a first period, where the program reads an input to the control system and an output from a prior iteration of the program from a shared memory to generate a new output; executing a second iteration of the program in a second processor core of the multi-core system during a second period that overlaps the first period; and using outputs of the iterations to control the control system, where read and write operations to the shared memory by the program are atomic.

In an exemplary embodiment, during the first iteration, the program performs a calculation on its input to calculate a value and store the value in a variable in the shared memory, and during the second iteration, the program is unable to read the variable until the program during the first iteration has finished storing the value.

In an exemplary embodiment, the control system includes a physical sensor that provides the input to the shared memory.

In an exemplary embodiment, the control system includes a physical actuator, and the outputs of the iterations are used to control the actuator.

In an exemplary embodiment, prior to the using, the method further includes executing a third iteration of the program in the first processor core of the multi-core system during a third period after the first period that overlaps the second period (e.g., when at least 2 Cores are present). However, if additional cores are present, the third iteration could have been executed in a third processor core.

For example, in an exemplary embodiment, prior to the using, the method further includes executing a third iteration of the program in a third processor core of the multi-core system during a third period after the first period that overlaps the second period. The method may be scaled upward to any number of processing cores.

According to an exemplary embodiment of the invention, a method of managing a control system includes: starting a first iteration of a program in a first processor core of a multi-core computer system, where the program reads an input to the control system and an output from a prior iteration of the program from a memory to generate a new output; the program of the first iteration, generating an event upon encountering a marker instruction indicating that a next iteration of the program has permission to proceed; starting execution of a second iteration of the program in a second processor core of the multi-core system in response to receipt of the event; and using outputs of the iterations to control the control system.

In an exemplary embodiment, generating the event includes sending a computer message of an event handler of an operating system of the system. In an exemplary embodiment, the starting execution of the second iteration of the program is performed by the event handler in response to receipt of the computer message.

In an exemplary embodiment, prior to the using, the method further includes the program of the second iteration, generating a second event upon encountering the marker instruction; and starting execution of a third iteration of the program in the first processor core in response to receipt of the second event.

In an exemplary embodiment, prior to the using, the method further includes: the program of the second iteration, generating a second event upon encountering the marker instruction; and starting execution of a third iteration of the program in a third processor core of the multi-core system in response to receipt of the second event.

According to an exemplary embodiment of the invention, a method of managing a control system includes: executing a first iteration of a program in a first processor core of a multi-core computer system during a first period, where the program reads an input to the control system and an output from a prior iteration of the program from a memory to generate a new output; executing a second iteration of the program in a second processor core of the multi-core system during a second period that overlaps the first period; determining whether a data dependency violation among the iterations has occurred; and using the output of the first iteration to control the control system if the violation has occurred.

In an exemplary embodiment, the method further includes halting and restarting the second iteration in the second processor core if the violation has occurred. In an exemplary embodiment, the method further includes starting a third iteration of the program in the first processor core or a third processor core of the multi-core system after the second iteration is restarted.

In an exemplary embodiment, the determining of the violation includes predicting whether a calculation of the second iteration using a variable will occur before the first iteration is scheduled to update that variable.

BRIEF DESCRIPTION OF THE SEVERAL VIEWS OF THE DRAWINGS

Exemplary embodiments of the disclosure can be understood in more detail from the following descriptions taken in conjunction with the accompanying drawings in which:

FIGS. 13A-D illustrate pipelining strategies according to exemplary embodiments of the invention.

DETAILED DESCRIPTION

Exemplary embodiments of the invention are discussed in further detail with reference to FIGS. 1-18. This invention may, however, be embodied in different forms and should not be construed as limited to the embodiments set forth herein.

It is to be understood that the systems and methods described herein may be implemented in various forms of hardware, software, firmware, special purpose processors, or a combination thereof. In particular, at least a portion of the present invention may be implemented as an application comprising program instructions that are tangibly embodied on one or more program storage devices (e.g., hard disk, magnetic floppy disk, RAM, ROM, CD ROM, etc.) and executable by any device or machine comprising suitable architecture, such as a general purpose digital computer having a processor, memory, and input/output interfaces. It is to be further understood that, because some of the constituent system components and process steps depicted in the accompanying Figures may be implemented in software, the connections between system modules (or the logic flow of method steps) may differ depending upon the manner in which the present invention is programmed. Given the teachings herein, one of ordinary skill in the related art will be able to contemplate these and similar implementations of the present invention.

Modern control systems need to be fast enough to control high-speed physical processes such as chemical and atomic reactions. The sampling time, or frequency between I/O synchronization, of a cyclic control system is known as scan cycle time and it is an important metric because it dictates the cost and ultimately the type of physical process the control system is able to control. The delay in I/O, known as jitter, is another parameter because it affects the accuracy and therefore the quality of the control. Cyclic control systems are often operating safety critical systems, and therefore their implementation needs to guarantee a deterministic execution, jitter-free, deterministic cycle time and I/O behavior of the control software. Cyclic control systems may be built on top of a well established computation model and a runtime system.

Figure 1:
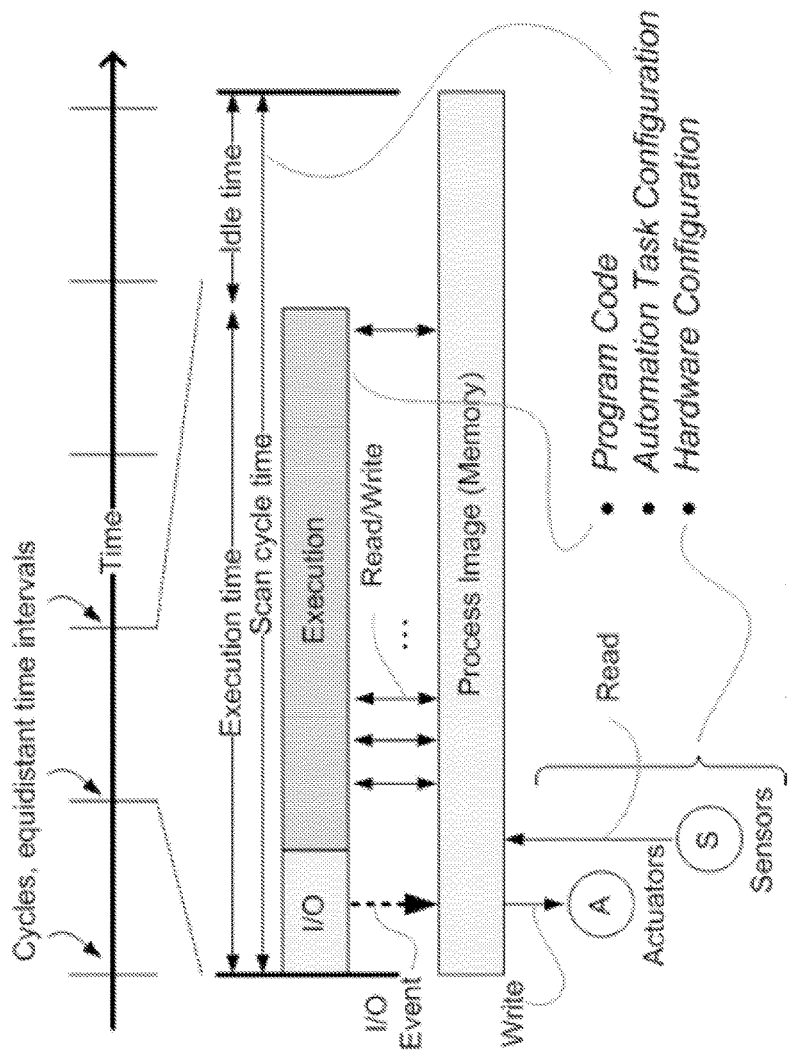
FIG. 1 illustrates an example of a memory that could be used to store input and output data of a control system.

The computation model of a cyclic control system may be based on automation tasks. An automation task is the cyclic execution of a control program on regular and equidistant time intervals called cycles as shown in FIG. 1. This scan cycle time is user-configurable and its length is determined by the frequency of the physical system under control. For every cycle, two logical actions are taken: (1) I/O and (2) execution of the program. The I/O event triggers a write/read operation to the process image (PI) to update the actuators and read the state of the sensors, respectively. The process image is an addressable memory area that serves as the interface between the control system and the sensors and the actuators connected to it, and it provides a "snapshot" of the sensors and actuators states. The process image is accessible through the execution of a cycle. The actual time required to execute the program within the cycle, including reading inputs and writing outputs, is known as execution time. If the execution of the program completes before the next cycle fires (i.e., the execution time is less than the scan cycle time), the program may be set to an idle state.

In cyclic control systems processing analog signals (e.g., motion control applications), the velocity with which the actuator (e.g., a motor) needs to bring the system to the desired position is calculated based on the sampled current position, and parameters such as maximum velocity, and acceleration.

Exemplary embodiments of the invention use a highly scalable parallelization approach for cyclic control systems based on pipelining. This approach may reduce the scan cycle time for an application, enable execution of additional workload while maintaining the original configured scan cycle time, or achieve compromises between scan cycle time reduction and execution of additional workload. At least one embodiment of the invention is a pipelining parallelization method that targets scan cycle reduction and execution of additional workload.

Pipelining refers to the decomposition of computation into stages (data processing program fragments) connected in series such that the outputs of a stage are the inputs of the following stage. The objective of pipelining is to increase the throughput of a system. Pipelining can be used to potentially maximize the utilization of resources by maintaining the stages busy at all times. Immediately after a stage concludes its execution, the result is dispatched to the next stage and computation of the next iteration (or data element) begins. If multiple processing units are available, different stages processing contiguous iterations can be executed in parallel.

Figure 2:
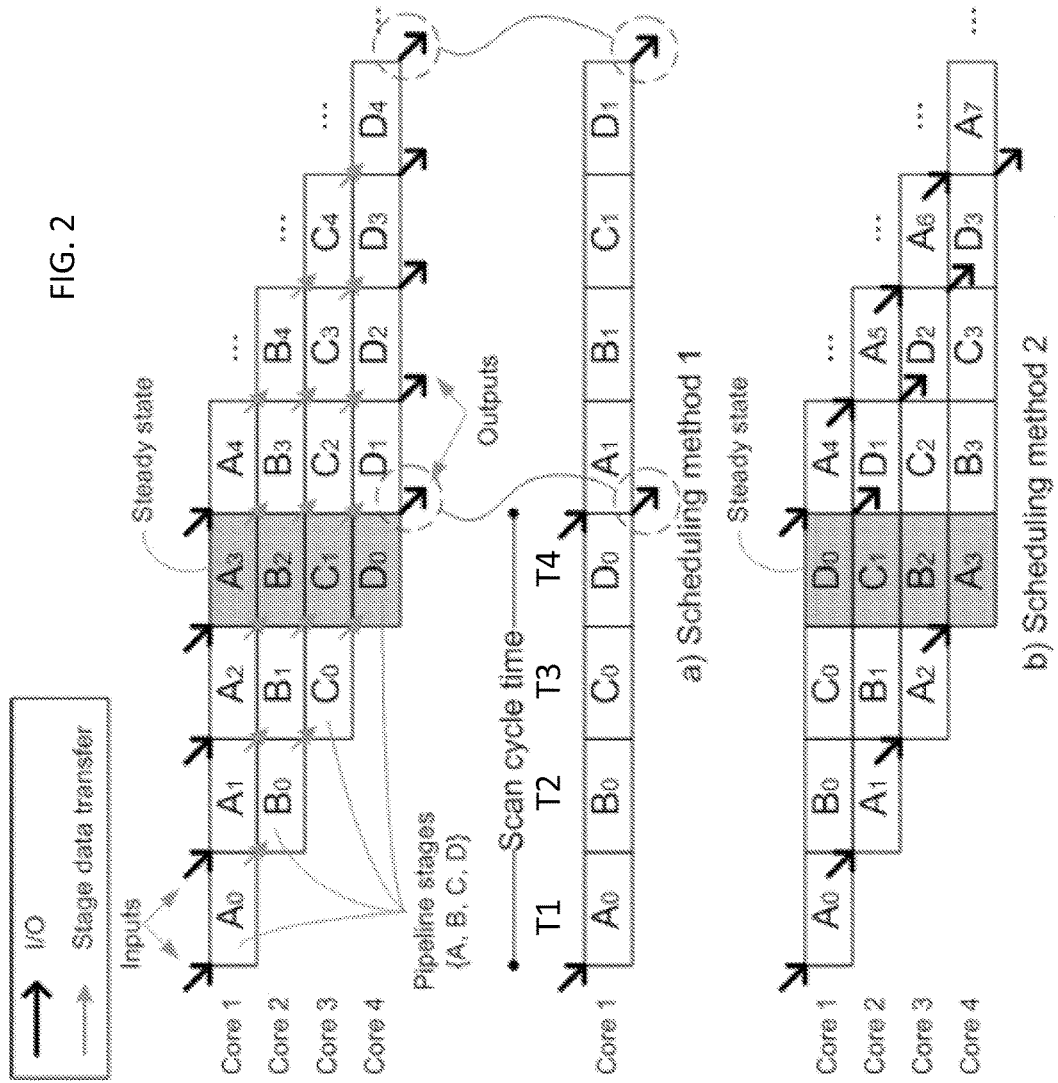
FIG. 2 illustrates pipelining strategies according to an exemplary embodiment of the invention.

FIG. 2 shows an example of a 4-stage (A, B, C, D) pipelined program executed on 4 cores. The subscripts denote the iteration number. In part (a) of FIG. 1 showing scheduling method 1; during time T1 process A is executed a first time by Core 1 (see $A_0$); during time T2 process A is executed a second time by Core 1 and process B is executed a first time by Core 2 (see $B_0$); during T3 process A is executed a third time by Core 1 (see $A_3$), process B is executed a second time by Core 2 (see $B_1$) and process C is executed a first time by Core 3 ($C_0$); during T4 process A is executed a fourth time by Core 1 (see $A_3$), process B is executed a third time by Core 2 (see $B_2$), process C is executed a second time by Core 3 (see $C_1$), and process D is executed a first time by Core 4 (see $C_0$). Once the steady state of the pipeline has been reached in the $4^{th}$ iteration (at T4), all cores are processing different stages and iterations of the program (i.e., $A_3$, $B_2$, $C_1$, $D_0$. In the scheduling method 1, one core is dedicated to each stage of the program. For example, Core 1 handles process A, Core 2 handles process B, Core 3 handles process C, and Core 4 handles process D.

In part (b) of FIG. 2 showing scheduling method 2, during time T1 process A is executed a first time by Core 1 (see $A_0$); during time T2 process A is executed a second time by Core 2 and process B is executed a first time by Core 1 (see $B_0$); during T3 process A is executed a third time by Core 3 (see $A_3$), process B is executed a second time by Core 2 (see $B_1$) and process C is executed a first time by Core 1 ($C_0$); during T4 process A is executed a fourth time by Core 4 (see $A_3$), process B is executed a third time by Core 3 (see $B_2$), process C is executed a second time by Core 2 (see $C_1$), and process D is executed a first time by Core 1 (see $C_0$). Once the steady state of the pipeline has been reached in the $4^{th}$ iteration (at T4), all cores are processing different stages and iterations of the program (i.e., $D_0$, $C_1$, $B_2$, $A_3$). In the scheduling method 2, the next iteration of a stage of a program is continuously shifted to the next available core. For example, Core 1 handles the first iteration of process A, Core 2 handles the second iteration of process A, Core 3 handles the third iteration of process A, etc.

The parallelism exhibited within FIG. 2 is known as pipeline parallelism. Pipeline parallelism may increase the throughput of a system by allowing for higher sampling rates, but does not reduce the execution time of one program iteration. The throughput of a pipeline is given by the length of the longest stage (also known as the critical path). If the pipeline stages are equally balanced, the throughput is proportional to the number of stages in the pipeline.

In the example given in FIG. 2, once the steady state has been reached, the pipelined program produces 4 times more input and outputs than the original program in a single core. While FIG. 2 shows two different pipelining methods, with potentially different performances, both achieve the same results. For example, scheduling method 1 produces less data transfer but it requires the context switch of the execution of one cycle after every stage of the pipeline completes. Scheduling method 2, on the other hand, does not require context switches and is easier to read. Therefore, embodiments of the invention will be discussed with respect to scheduling method 2. However, the embodiments of the invention are not limited thereto, as they may be applied also to scheduling 1.

In at least one embodiment of the invention, a time-based partitioning approach is applied to cyclic control systems. The overlapping of contiguous iterations of a cyclic control program are enabled in a pipelined manner.

Figure 3:
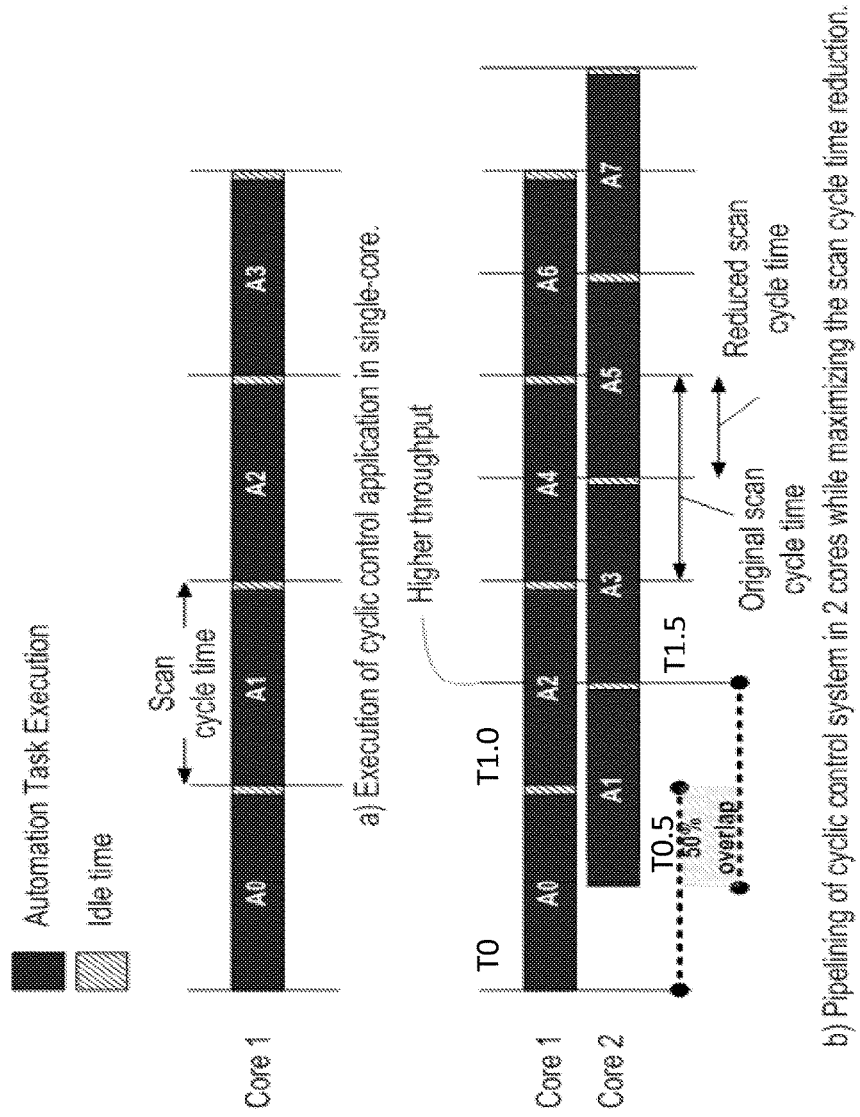
FIG. 3. illustrates pipelining strategies according to an exemplary embodiment of the invention.

FIG. 3 shows a comparison between execution of a cyclic control application in a single-core and execution of the cyclic control application on two cores according to an exemplary embodiment of the invention. The program A shown in part (a) of FIG. 3, when pipelined for maximizing the scan cycle reduction, produces twice as many inputs and outputs as seen by part (b) of FIG. 3. This is possible because two contiguous iterations are executed concurrently with an overlap of 50% with respect to each other. For example, in part (b) of FIG. 3, the first iteration of program A ($A_0$) is executed by Core 1 at time T0, the second iteration of program A ($A_1$) is executed by Core 2 at time T0.5, the third iteration of program A ($A_2$) is executed by Core 1 at time T1.0, the fourth iteration of program A ($A_3$) is executed by Core 2 at time T1.5, etc. Since two cores are present in this example, the scheduling algorithm constantly toggles between the Cores for scheduling the next iteration of the program A. This scheduling method may be useful when very small scan cycle times are needed for reconstruction of analog I/Os.

If a third core is added, the scheduling method could instead schedule the third iteration of program A ($A_2$) for execution on Core 3 at time T1.0, and schedule the fourth iteration of program A ($A_3$) for execution on Core 1 at time T1.5. If there are additional programs (e.g., B) of the cyclic process to execute, a different set of the available cores can be used to handle their processing (e.g., third and fourth cores).

With 2. Cores, the pipeline parallelism reduces the scan cycle time down to a factor of 0.5. In general, N cores reduces the scan cycle time at best by a factor of 1/N.

Figure 4:
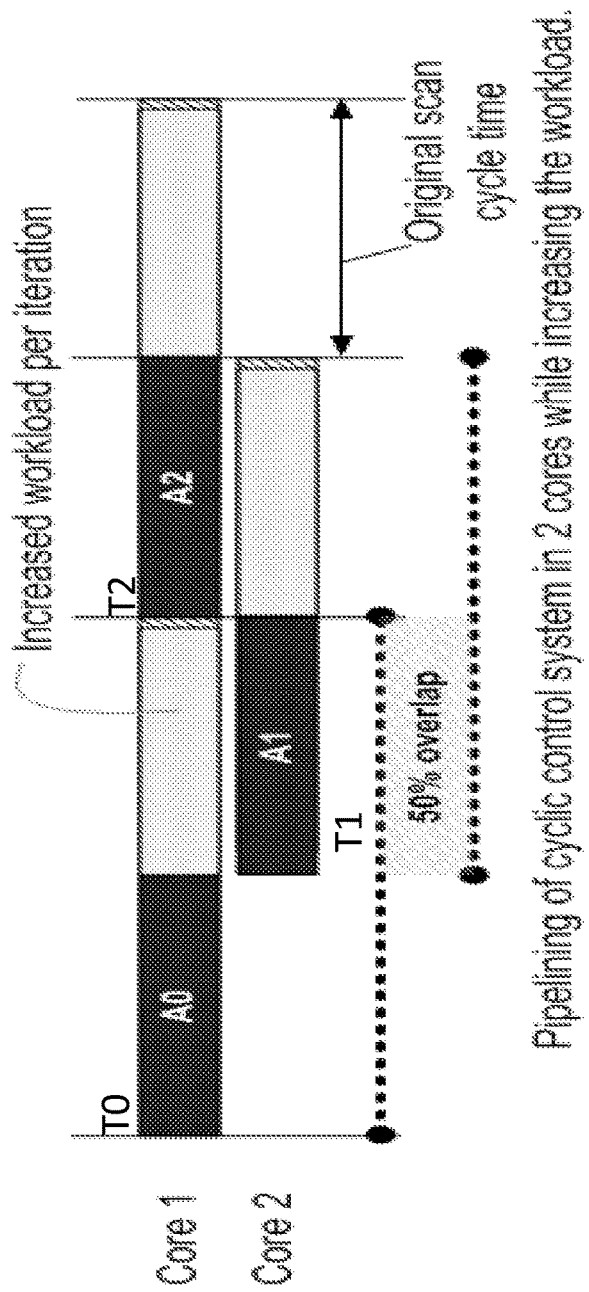
FIG. 4. illustrates a pipelining strategy according to an exemplary embodiment of the invention.

FIG. 4 shows an embodiment of the invention, where the program is pipelined to maximize additional workload. As shown in FIG. 4, the original scan cycle time remains the same, but each iteration is capable of utilizing the otherwise idle time to execute additional instructions. As shown in FIG. 4, the first iteration of program A ($A_0$) is executed by Core 1 at time T0, the second iteration of program A ($A_1$) is executed by Core 2 at time T1, and the third iteration of program A ($A_2$) is executed by Core 1 at time T2. This is similar to the scheduling method shown in part (a) of FIG. 3, in that the first and third iterations of program A are executed by Core 1 at times T0 and T2, respectively. However, different from the scheduling method shown in part (a) of FIG. 3, Core 2 is used at time T1 to execute the second iteration of program A. This, frees up Core 1 and Core 2 to execute other work or other parts of the cyclic program (e.g., program B). For example, the first iteration of program B could be executed by Core 1 at time T1, the second iteration of program B could be executed by Core 2 at time T2, etc.

Figure 5:
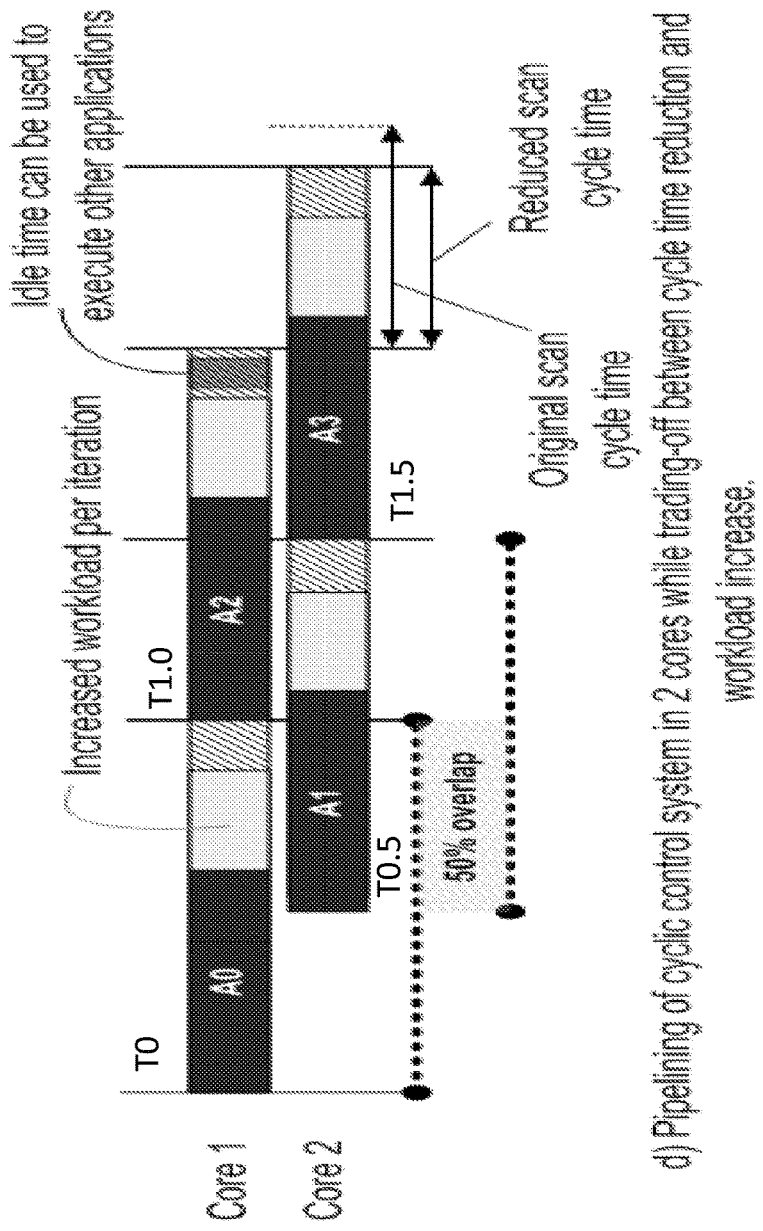
FIG. 5. illustrates a pipelining strategy according to an exemplary embodiment of the invention.

FIG. 5 illustrates an embodiment of the invention, where the program is pipelined so that scan cycle time is reduced while increasing the workload per iteration. As shown in FIG. 5, the first iteration of program A ($A_0$) is executed by Core 1 at time T0, the second iteration of program A ($A_1$) is executed by Core 2 at time T0.5, the third iteration of program A ($A_2$) is executed by Core 1 at time T1.0, and the fourth iteration of program A (A3) is executed by Core 2 at time T1.5. For example, instead of being able to schedule the first iteration of program B during T1.0-T2.0 as in FIG. 5, there is only enough time to schedule the first iteration of program B during T1.0-T1.5. However, if it takes half as much time to execute program B as program A, it may be optimal to schedule programs A and B according to FIG. 5. This approach provides high flexibility for the cyclic control system and for the application programmer because it can be configured according to the requirements of the application.

Figure 6:
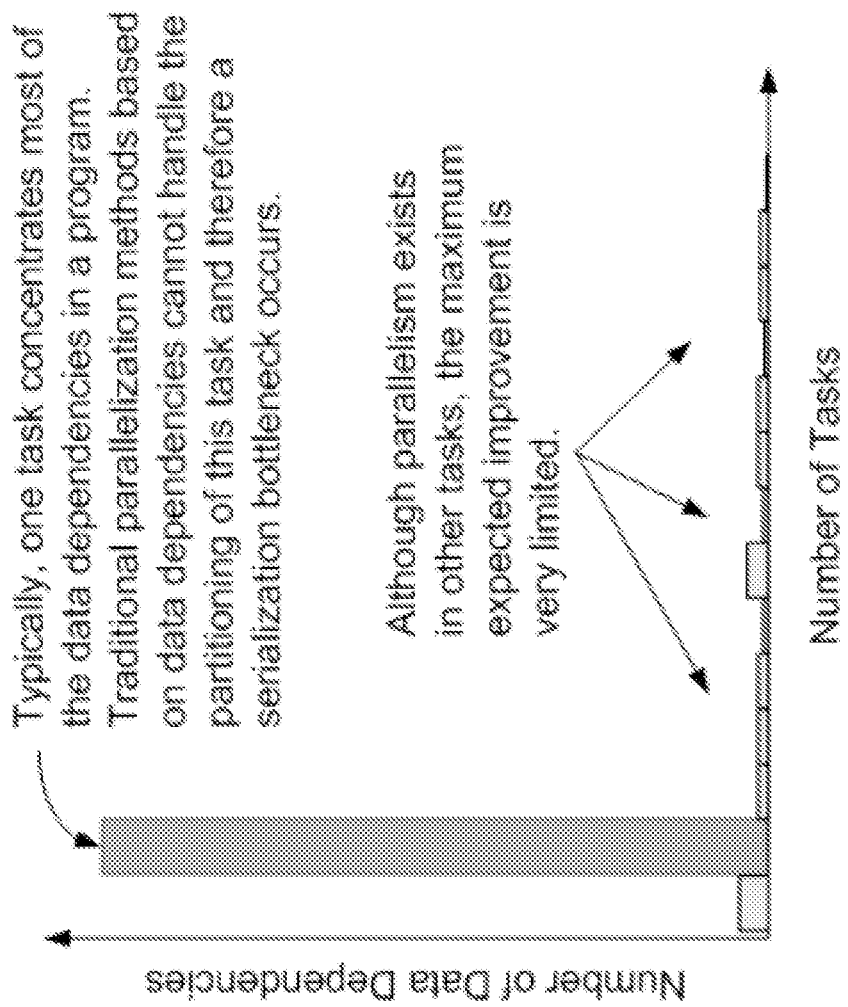
FIG. 6 shows an exemplary distribution of data dependencies in a cyclic control program.

FIG. 6 shows a typical distribution of data dependencies in a cyclic control program. Although several tasks are identified (e.g., automation task parallelism), one single task accounts for more than 90% of the data dependencies of the program. Data dependencies inhibit parallelism and therefore the scalability of existing parallelization approaches because scheduling these programs into multiple cores results in an imbalanced execution where only one core is highly utilized and others are idle for most of the scan cycled time, as shown in FIG. 6. The lack of scalability is also manifested in the limited gains of scan cycle time when using this approach, which may be a very important aspect in cyclic control systems.

Figure 7:
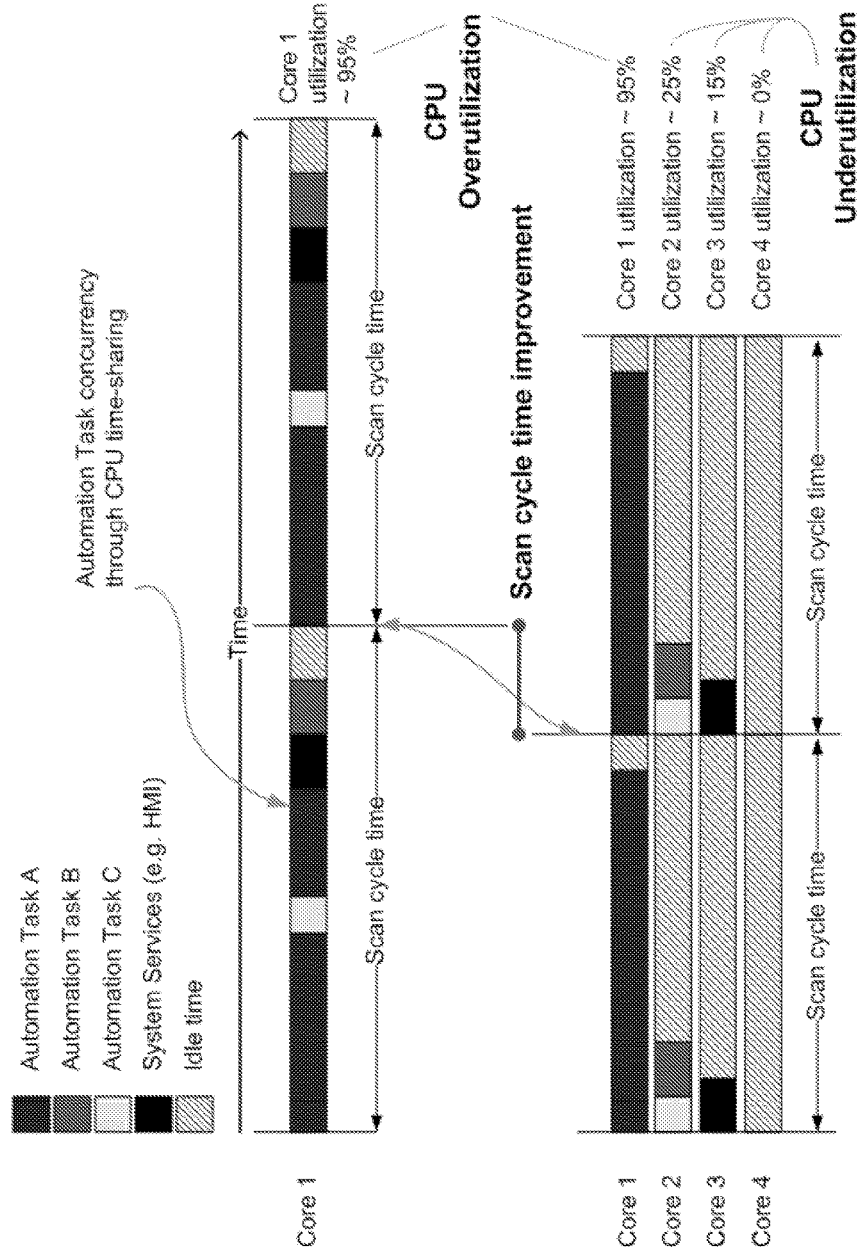
FIG. 7 shows an example of multiple cores being over and underutilized.

The limits of parallelism, including pipelining parallelism, are the data dependencies in a program. Explicit data dependencies can be computed by dataflow analysis techniques at compile-time because causality is expressed within the defined local and global variables, and the process image. Implicit data dependencies, on the other hand, are impossible to track at compile-time because of the indirect memory references that are resolved only at run-time. A run-time data dependence analysis may be performed, but the overhead is high and it directly increases jitter of the system because there are unforeseeable computations necessary to calculate the data dependencies at runtime. An application-level parallelization technique may perform parallelization only at compile time. However, this approach ignores many other parallelization opportunities hidden in the implicit data dependencies that cause an imbalanced load distribution that inhibit scalability in multi-core systems, as shown in FIG. 7.

Cyclic control systems call for a light-weight parallelization approach whose run-time performance has a negligible impact in the jitter of the system. However, rather than tracking the implicit data dependencies, an embodiment of the invention relies on a time-based serialization process used by cyclic control systems to identify points in time where other tasks within the same cycle should be preempted (paused).

However, rather than using this mechanism for time-sharing multiple tasks in a single CPU, an embodiment of the invention uses the mechanism for identifying time-based break-points to create pipeline stages in multiple CPUs or multiple processing cores. This mechanism may guarantee correct execution while honoring both explicit and implicit data dependencies. This light-weight run-time method not only creates valid partitioning of the program into pipeline stages, but also hides the parallelization complexity from the application engineer, the compiler, and runtime. This is beneficial for a cyclic control system because the application engineer does not need to modify existing programs, or to specify parallelization primitives in new programs to take full advantage of the benefits of a pipelining method according to an embodiment of the invention.

Figure 8:
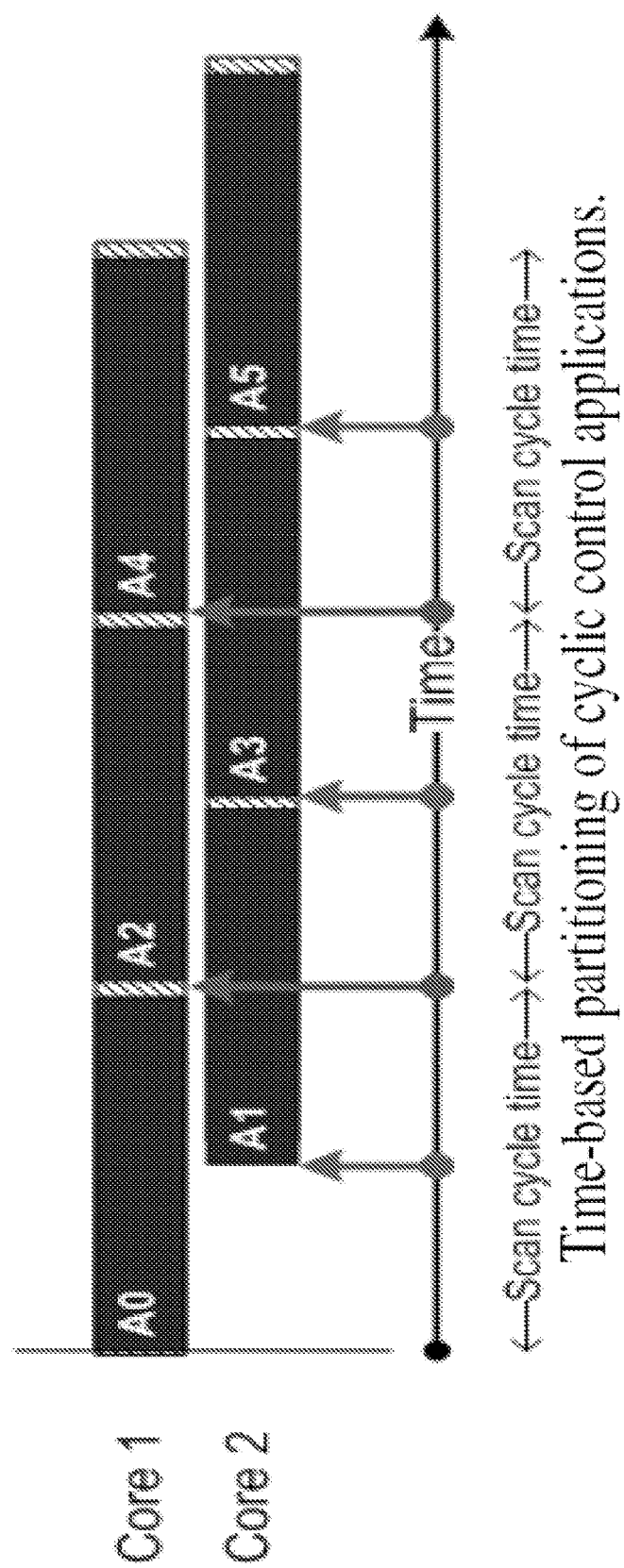
FIG. 8 illustrates a pipelining strategy according to an exemplary embodiment of the invention.

FIG. 8 shows how a pipelining method according to an exemplary embodiment of the invention leverages the time-based serialization events generated by an operating system to time-share a single CPU or core to create pipeline stages and to distribute the workload among multiple cores. While the even numbered iterations (A0, A2, A4, ... ) are fired by the original time based events that dictate the scan cycle time in Core 1, the odd iterations (e.g., A1, A3, A5, ... ) are fired by an event that occurs exactly half the scan cycle time in Core 2. Scalability across cores is possible because additional time-based events fire new iterations in different cores. Similarly, scan cycle time reduction and/or workload increase is determined by the points in time when these time-based events occur. Therefore, by leveraging the same serialization events generated by the operating system to exploit concurrency in a single core, new pipeline parallelization opportunities are created without tracking the explicit and implicit data dependencies and maintaining the same execution order as in a uni-processor implementation. Thus, this light-weight mechanism implemented in a cyclic control system can be reused for pipelining applications without incurring additional and unwanted jitter and performance penalties.

Pipelining a cyclic control application requires special consideration because having multiple iterations being executed simultaneously may cause data inconsistencies in the process image when, for example, data is overwritten by old and invalid data from previous chronological iterations that complete and write to the process image after a future chronological iteration attempts to read that memory location of the process image. Therefore, a pipelined cyclic control system relies on the assumption of a consistent process image during the execution of one cycle that provides an accurate snapshot of the state of the sensors and the actuators in the system.

For convenience of describing an embodiment of the invention, an application is considered whose object is to detect and count the rising edges of a digital signal. In a given cycle, the state of the input signal (1 or 0) is compared to the state of the signal on the previous cycle to determine whether there was a rising edge (e.g., has there been a transition from 0 to 1). In other words, on every iteration, the current input's state is stored in memory and used by the next iteration to detect edges. This type of application is stateful because the state of the external system is maintained within the control application. Variables used to store the state of the system in the application may be referred to as stateful variables. Maintaining the state in memory becomes problematic when the multiple iterations overlap in time because iterations may read old data and cause a miss-detection or a double-detection of a rising edge.

Figure 9:
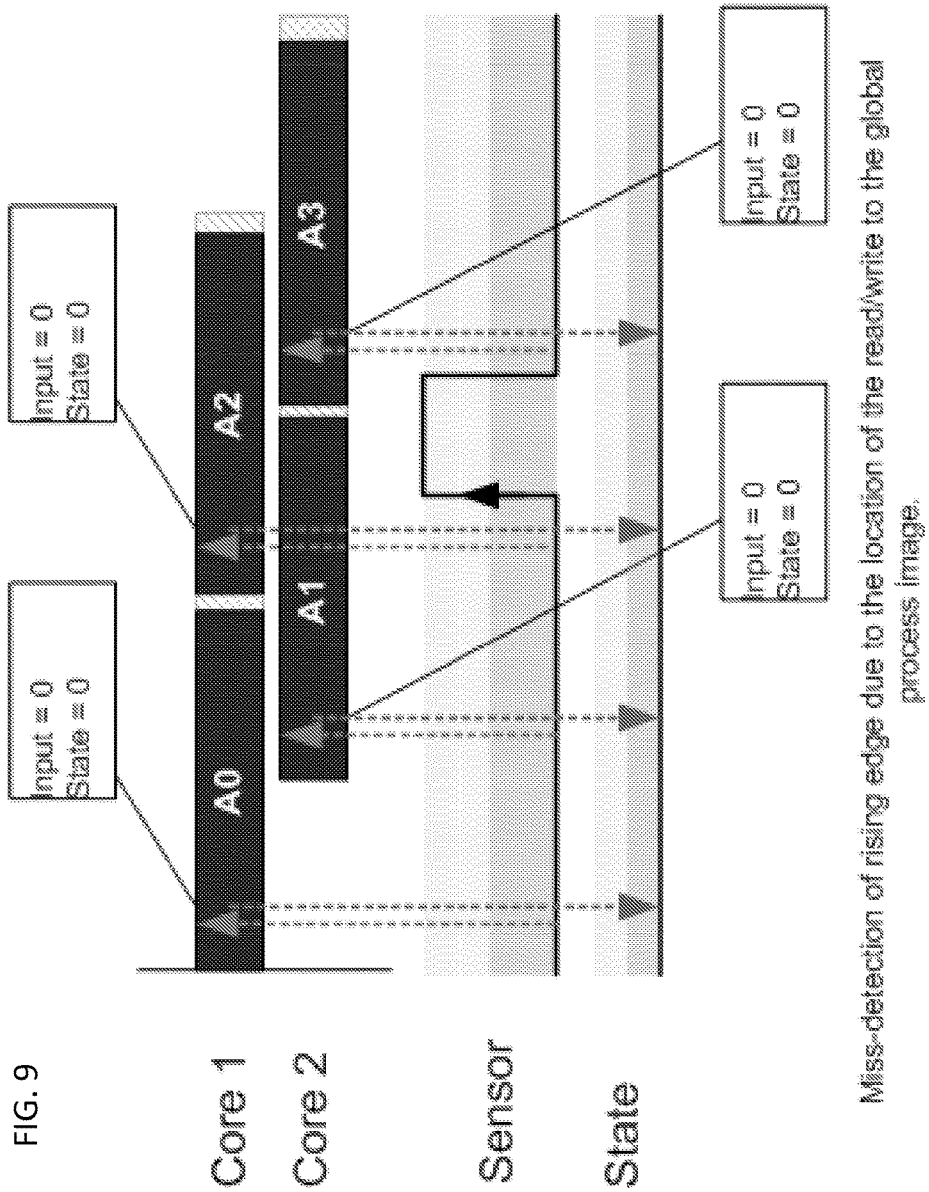
FIG. 9 illustrates a pipelining strategy according to an exemplary embodiment of the invention.
Figure 10:
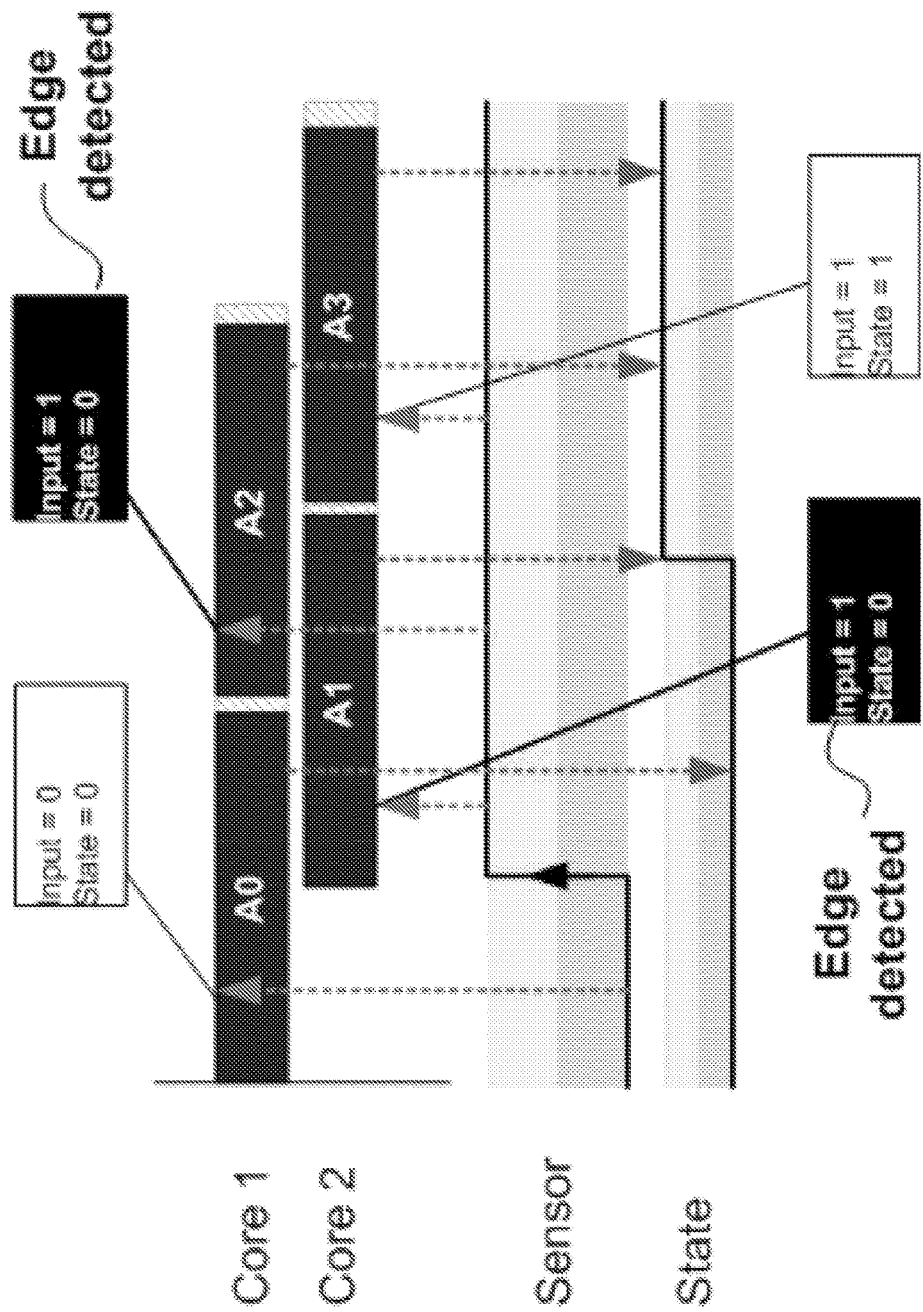
FIG. 10 illustrates a pipelining strategy according to an exemplary embodiment of the invention.

FIG. 9 and FIG. 10 show a pipelined program in 2 Cores with 50% overlap where two iterations detect the same rising edge (e.g., a double detection). For example, the read of the sensor data occurs at the beginning of the cycle and the write of the state to the global process image occurs at the end of the cycle. In this example, there is a double-detection by A1 and A2 because although A1 identifies a rising edge, it fails to update the global process image before A2 reads the state data. Thus, A2 reads "0" when in reality the state is "1". This issue could be resolved by reducing the gap between the reads/writes of the process image and enforcing that cycles commit data before the following iterations read it.

Applications that do not store state information in the program because the state of the physical system is directly read through sensors and modified through actuators are referred to as stateless applications. In stateless applications, the state is in the devices (e.g., sensors, actuators, and the physical system) and not in the program.

One example of a stateless application is an air conditioning control system that periodically reads the temperature of a room (e.g., state) to decide whether it is appropriate to turn on or off the cooling system according to a set point. Although the set point is maintained within the application, the state of the system is determined by the sensor data and modified directly through actuator data. Another example is a motion control application that reads the position of axels (state) from the I/Os to calculate the velocity of the drive for the next cycle. Stateless applications do not present a challenge for pipelining because each iteration is independent from each other and therefore they can be fully parallelized.

Although pipelining can be used to reduce the scan cycle time and/or to increase the workload, there are several aspects that need to be considered for an implementation in a cyclic control system. At least one embodiment of the invention makes use of an overlap parameter to control the pipelining approach to either minimize the scan cycle time, maximize the workload, or find a compromise between the two.

Figure 11:
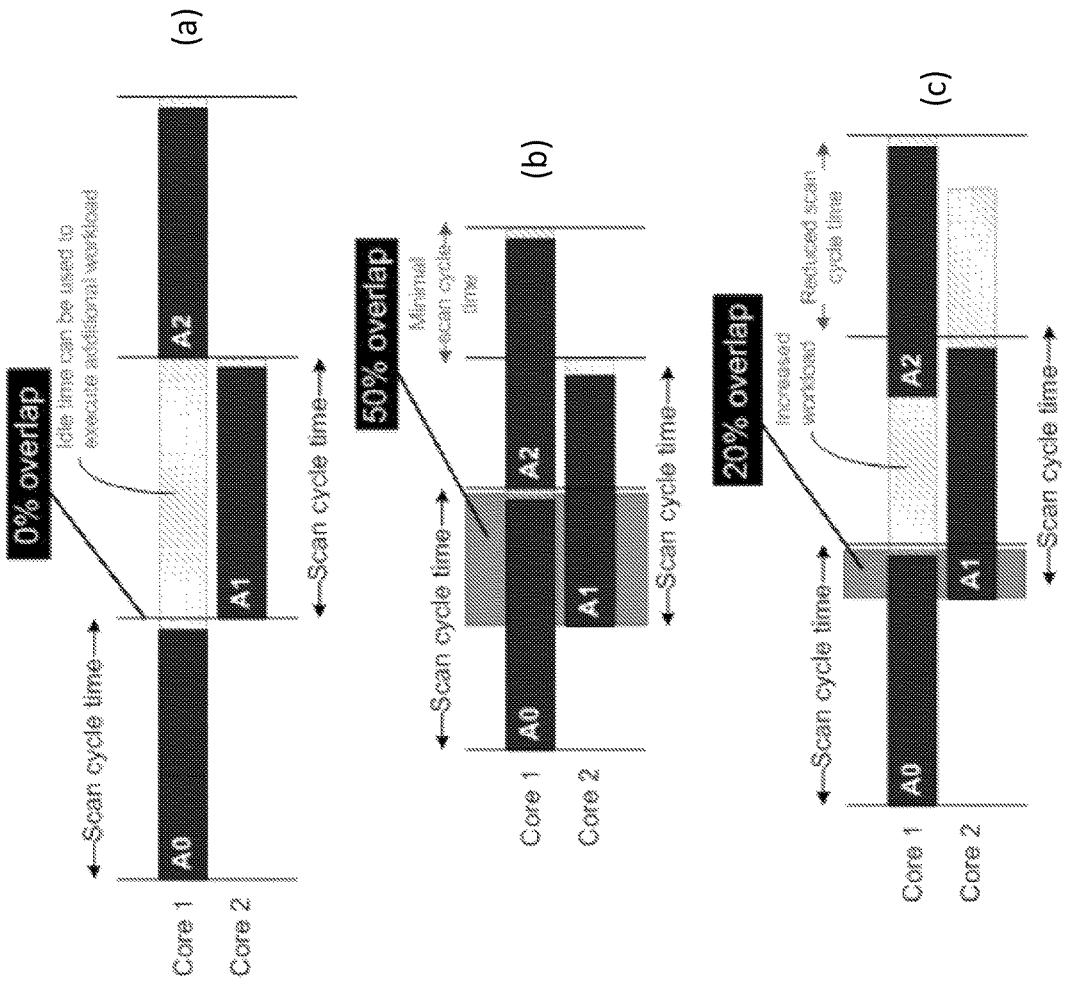
FIG. 11 illustrates a pipelining strategy according to an exemplary embodiment of the invention.

FIG. 11 shows how the overlap parameter can accomplish three pipelining configurations, according to exemplary embodiments of the invention. Part (a) of FIG. 11 shows that a 0% overlap represents the configuration for maximal workload increase while maintaining the original configured scan cycle time. This is possible because the interleaving of iterations results in idle time that can be used to execute additional workload. The increased workload is proportional to a factor of Nx, where N is the number of cores in the system. In this example with 2 cores, the workload increase is 2x.

Part (b) of FIG. 11 shows that (1/N)*100% overlap, where N is the number of cores in the system minimizes the scan cycle time and effectively produces N as many equidistant process image updates. In this example with 2 cores, a 50% overlap produces 2 times more process image updates. To accomplish a compromise between increased workload and cycle time reduction, overlap should be both greater than 0 and less than (1/N)*100 (e.g., 0<Overlap<(1/N)*100). This configuration reduces the cycle time and also creates idle periods that can be used to increase the workload. Part (c) of FIG. 11 shows a 20% overlap in 2 cores reduces the scan cycle time and increases the workload that can be executed in the idle times.

Figure 12:
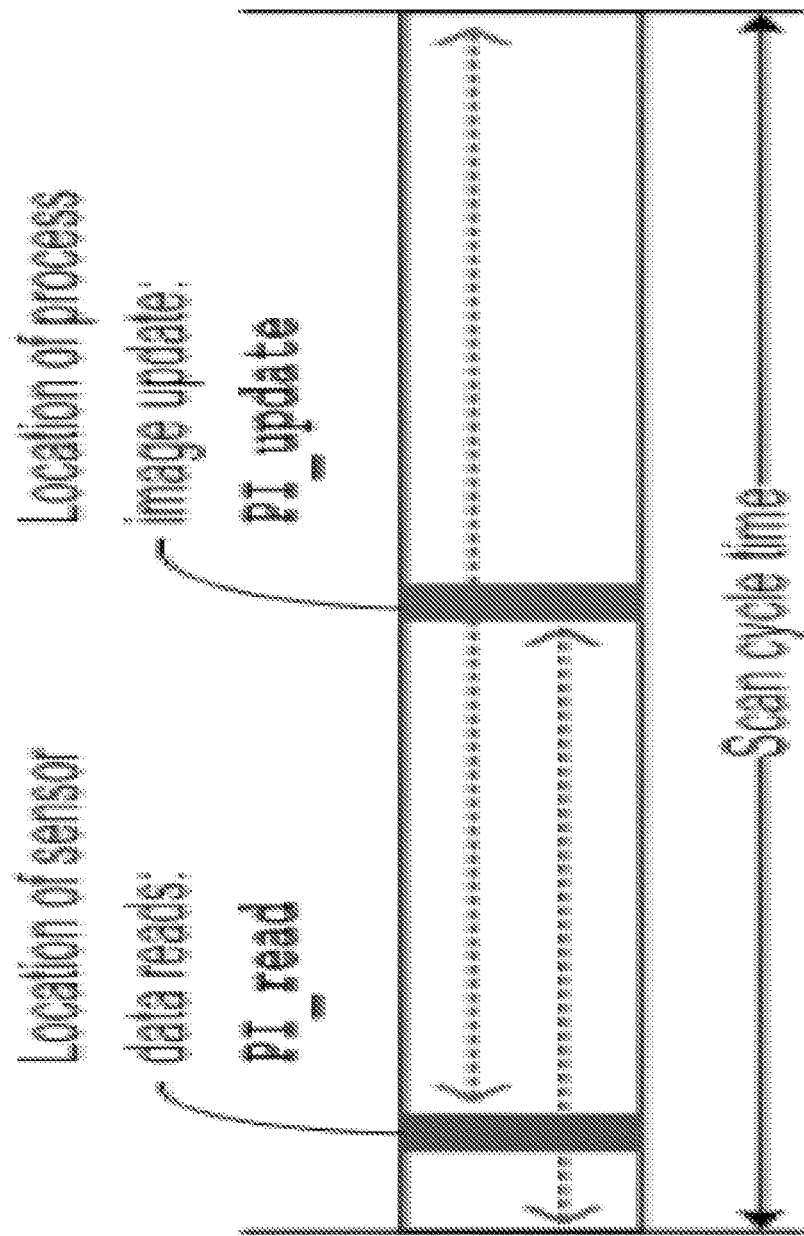
FIG. 12 illustrates parameters used to control the location within an iteration where data is read/written by a program according to an exemplary embodiment of the invention.

As shown in FIG. 12, two parameters PI_read and PI_update are defined that control the location within an iteration where sensor data is read from the process image and where the actuator data is written (updated) to the process image, respectively. The location can be anywhere within the cycle and the only rule is to execute the process image reads before the process image updates. In other words, PI_read<PI_update.

FIGS. 13A-D shows conceptually four pipelining schemes according to exemplary embodiments of the inventive concept. These schemes decouple pipeline stages by using a privatized process image for each cycle and forwarding data among a cycle's private image process image, such that the next iteration is correctly initialized. What differentiates these pipelining schemes is the location, within a cycle, where the process image is initialized.

The MOST_RECENT_UPDATE scheme in FIG. 13A defines that a cycle (A3) reads the process image whenever it is required (e.g., at the beginning of the cycle) under the assumption that the producer iteration (e.g., A2) has committed its data. This scheme performs the process image data reads at the beginning of a cycle and assumes that the previous cycle committed the most recent process image data. Therefore, this scheme provides limited flexibility to position the process image updates within an iteration because this location should never exceed the overlap limit with respect to the next iteration.

The GLOBAL_UPDATE scheme in FIG. 13B is similar to the scheme of FIG. 12A. The difference is that the GLOBAL_UPDATE uses the shared global memory ("M") instead of the privatized memory copies for each cycle and the read-write accesses to critical variables (states) are atomic to avoid data dependence violations and incorrect execution. In other words, the overlap is dictated by the read-write chains of critical variables in the global memory where accesses are atomic. This scheme allows for the process image data reads to be anywhere from the beginning of a cycle to the location where the process image is written.

The END_CYCLE_SAME_CORE scheme in FIG. 13C defines that the process image contains the data committed by the previous iteration allocated to the same core (e.g., A1→A3). There is high flexibility to position the process image update anywhere within an iteration because contiguous iterations executed in the same core never overlap and the process is guaranteed to contain consistent data committed by the previous iteration.

The END_CYCLE_DIFFERENT_CORE scheme in FIG. 13D defines that the process image contains the data committed by the previous iteration allocated to a different core (e.g., A2→A3). This provides the strictest scheme because the process image data reads is performed at the beginning of a cycle and the process image update is performed immediately after. However, it still allows for overlapping of contiguous iterations.

Figure 14:
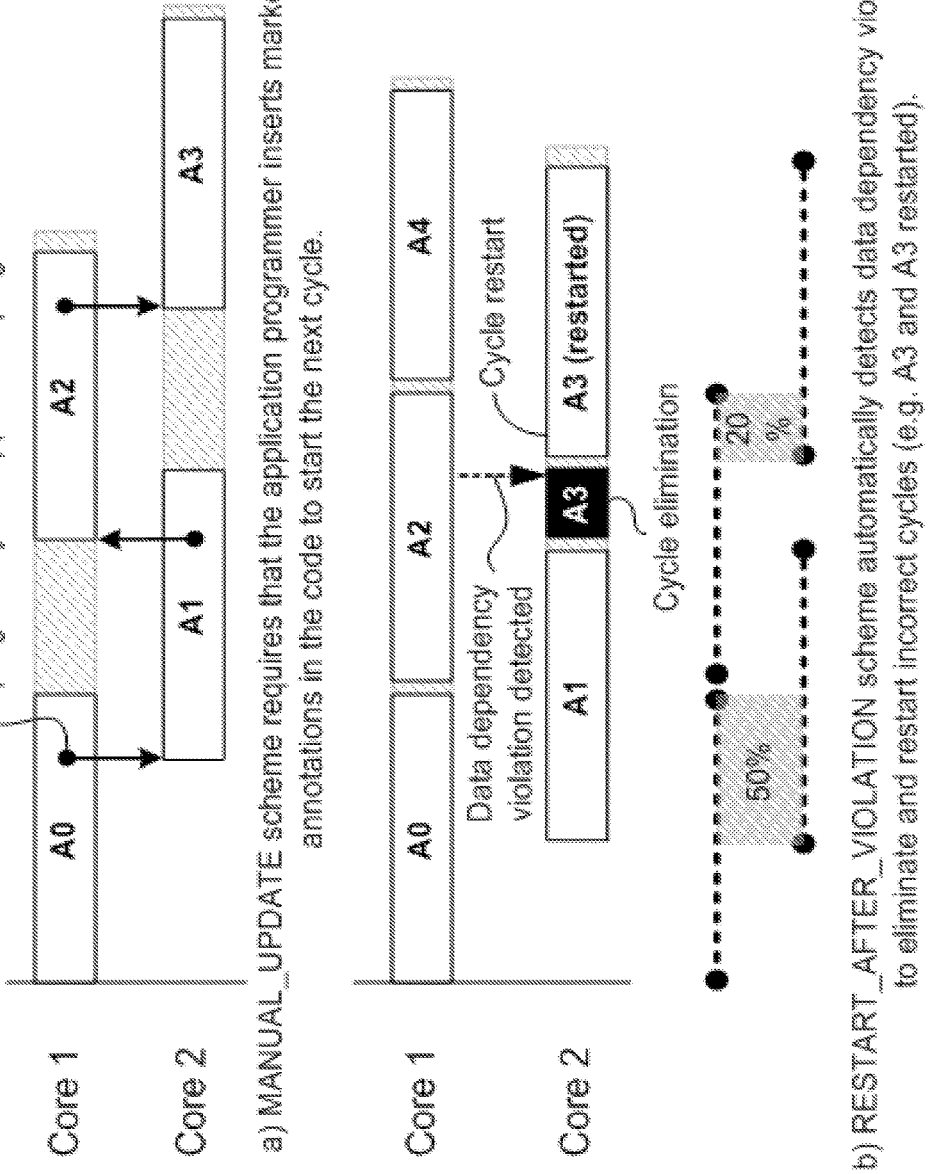
FIG. 14 illustrates pipelining strategies according to exemplary embodiments of the invention.

Two additional pipelining schemes, according to an exemplary embodiment of the invention are presented in FIG. 14. The MANUAL_UPDATE scheme shown in part (a) of FIG. 14 defines that the application programmer sets the overlap between cycles by inserting a marker or annotation in the program that the runtime interprets as a signal to start the next cycle. Thus, the MANUAL_UPDATE relies on manual identification of the stateful variables by the application engineer. MANUAL_UPDATE also requires that the marker be inserted in the application code by the application programmer that identifies the location within the cycle where the next cycle can be started without causing a stateful data dependence violation.

The RESTART_AFTER_VIOLATION scheme shown in part (b) of the FIG. 14 defines a speculative scheme where cycles are started under the assumption that no data dependent violations exist. However, if a data violation is detected on a critical state variable (e.g., A2 in Core 1), the incorrect cycles are eliminated from the pipeline (e.g., shaded A3 in Core 2) and restarted (e.g., A3 restarted in Core 2). Although the eliminated cycle is restarted immediately after the data dependency violation on stateful variables is detected, the overlap between contiguous iterations is reduced and this ultimately affects the cycle time reduction and/or workload increase. In this example, the original overlap is 50% (A0 and A1) and after the violation in A2 occurs, the overlap is reduced to 20% (A2 and A3 restarted).

Figure 15:
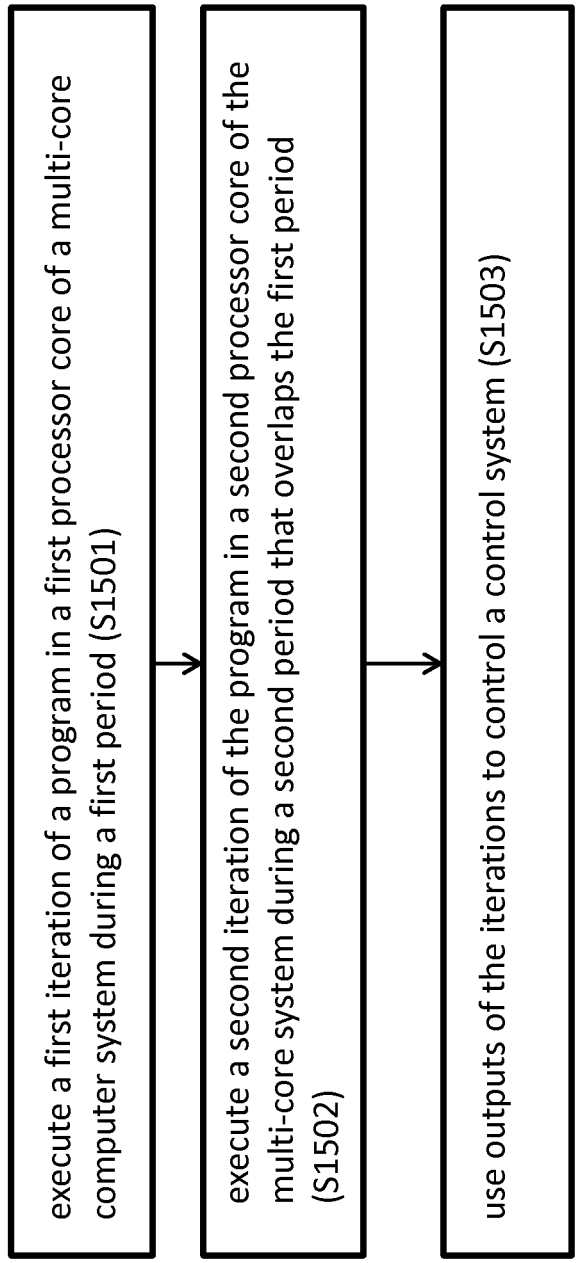
FIG. 15 illustrates a method for controlling a control system according to an exemplary embodiment of the invention.

FIG. 15 illustrates a method of controlling a control system according to an exemplary embodiment of the invention. Referring to FIG. 15, the method includes executing a first iteration of a program in a first processor core (Core 1) of a multi-core computer system during a first period (S1501). For example, as shown in FIG. 13B, a first iteration of program (A0) is executed during a first period in Core 1. The program reads an input to a control system and an output from a prior iteration of the program from a shared memory to generate a new output. For example, as shown in FIG. 1, the sensors may provide the input to the shared memory. The first iteration performs a calculation on the read values, and the result may be used to control/adjust the control system. For example, the result can be used to drive an actuator of the system. The method further includes executing a second iteration of the program (A1) in a second processor core (Core 2) of the multi-core system during a second period that overlaps the first period. For example, as shown in FIG. 13B, the first and second periods in which the first and second iterations A0 and A1 execute, overlap. Further, the output of A0 is stored in the shared memory, and is read by A1 along with the new input to the control system stored in the shared memory by the sensors for re-performing the same calculation. The outputs of the iterations (e.g., A0 and A1) are used to control the control signal (S1503). For example, if the control system is a thermostat, and the first iteration produced a temperature of 70 degrees and the second iteration produced a temperature of 71 degrees, the user might observe the screen of the thermostat quickly switch from displaying 70 degrees to displaying 71 degrees.

Further, the shared memory may be configured such that all reads and writes of a same state variable by a given iteration of the program are carried out atomically. For example, if a first iteration is to perform a write, and a second iteration is to perform a read, the write is always completed before the read starts. For example, when A0 starts updating a state variable, A1 will be prevented from reading that state variable from the shared memory until A0 has finished. While A1 is being prevented, it may be waiting or be in a suspended state. For example, A1 could continue to loop until the state variable is free.

Figure 16:
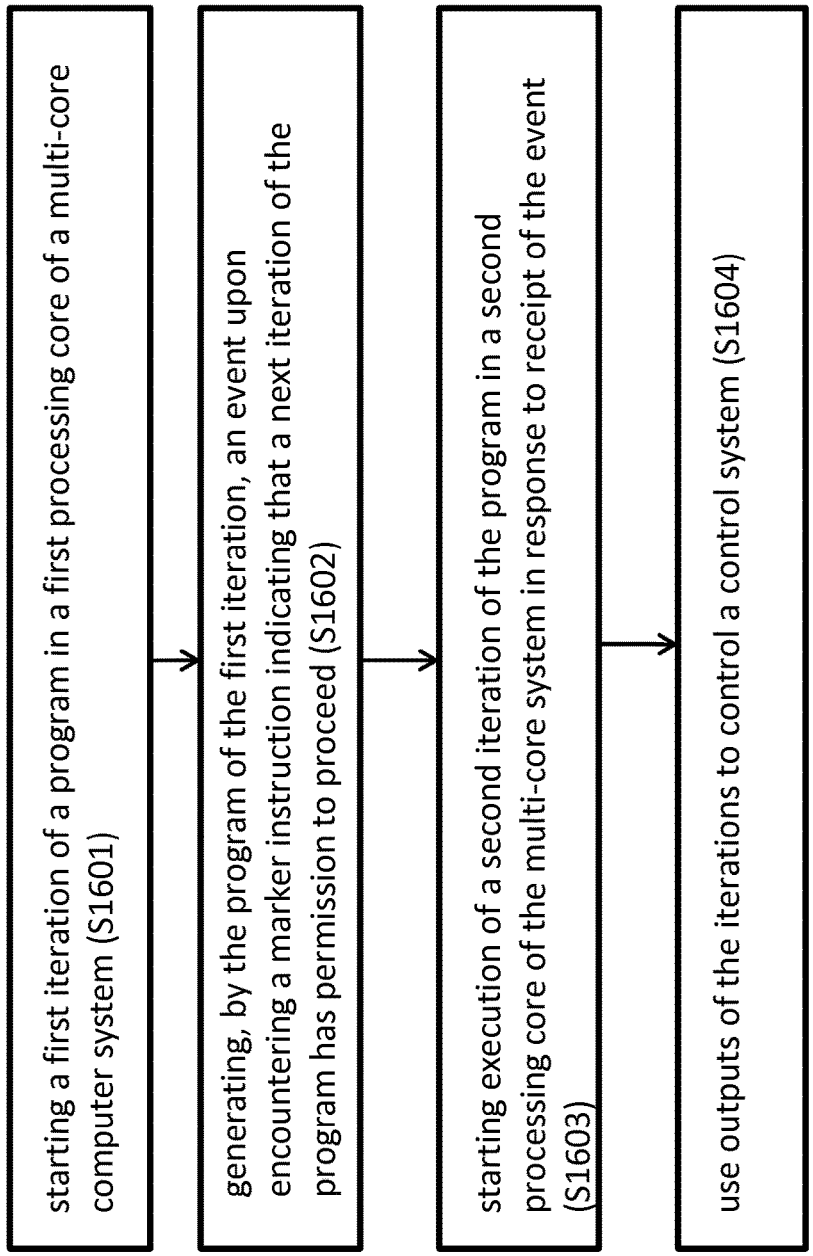
FIG. 16 illustrates a method for controlling a control system according to an exemplary embodiment of the invention.

FIG. 16 illustrates a method of controlling a control system according to an exemplary embodiment of the invention. Referring to FIG. 16, the method includes starting a first iteration of a program in a first processing core of a multi-core computer system (S1601). For example, as shown in part (a) of FIG. 14, the first iteration (A0) of program A is started in Core 1. Next, the method includes generating, by the program of the first iteration, an event upon encountering a marker instruction indicating that a next iteration of the program has permission to proceed (S1602). For example, as shown in FIG. 14, a marker or annotation was previously inserted in the program at a particular location, and when the program reaches this location, it creates an event. In an embodiment, the program was previously registered with an event handler of the operating system, and creation of the event by the program is performed by the program passing a computer message (or making a call) to the event handler. Next, the method includes starting execution of a second iteration of the program in a second processing core of the multi-core system in response to receipt of the event (S1603). For example, in response to receiving the message from the first iteration of the program, the event handler can start execution of the second iteration of the program. Next, the outputs of the iterations are used to control the control system (S1604).

Figure 17:
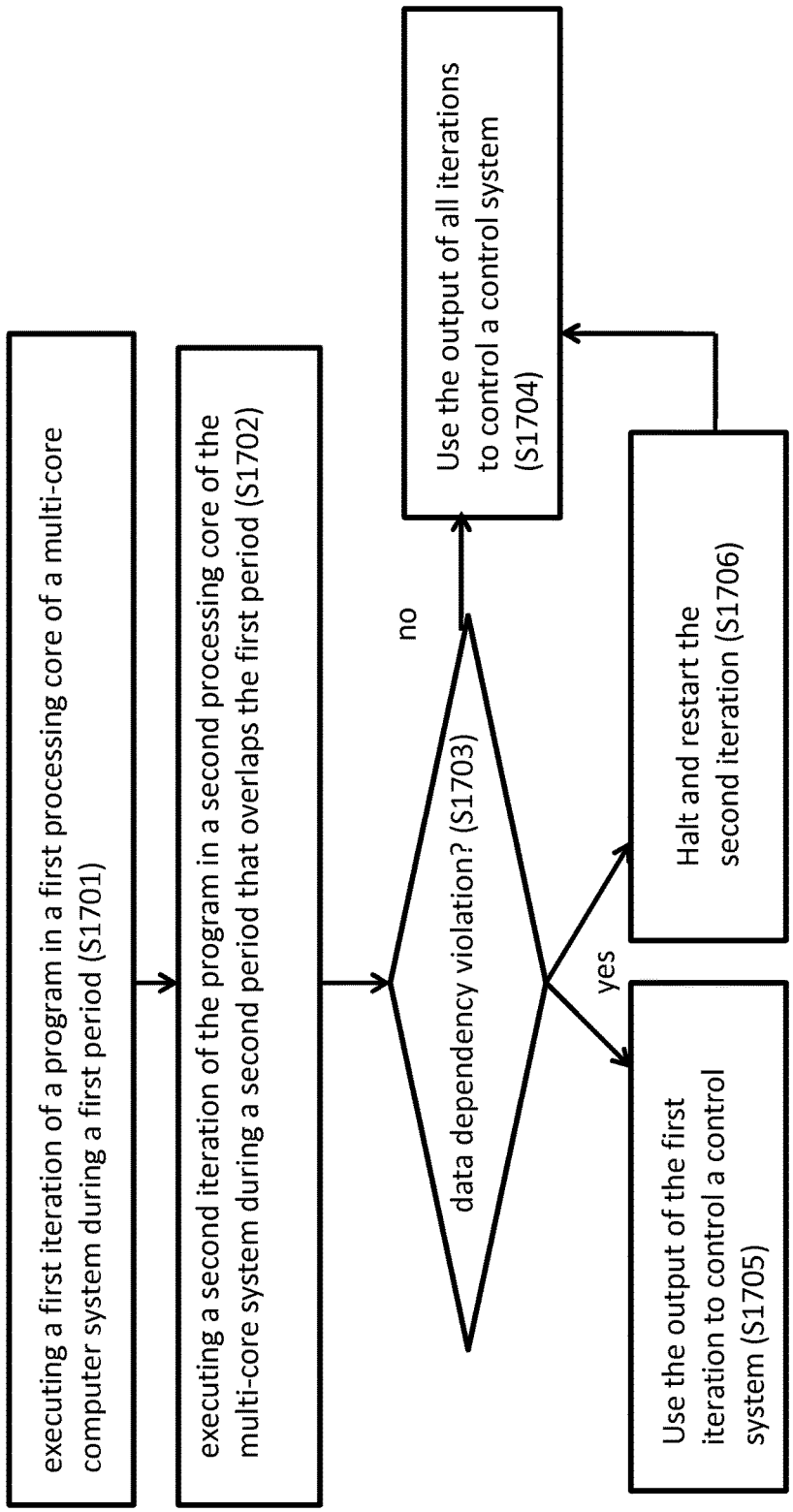
FIG. 17 illustrates a method for controlling a control system according to an exemplary embodiment of the invention.

FIG. 17 illustrates a method of controlling a control system according to an exemplary embodiment of the invention. Referring to FIG. 17, the method includes executing a first iteration of the program in a first processing core of a multi-core computer system during a first period (S1701). For example, as shown in part (b) of FIG. 14, a first iteration of program A (A2) is executed in Core 1 during a first period. Next, the method includes executing a second iteration of the program in a second processing core of the multi-core system during a second period that overlaps the first period (S1702). For example, as shown in part (b) of FIG. 14, a second iteration of program A (A3) is executed in Core 2 during a second overlapping period. The method next includes determining whether a data dependency violation has occurred (S1703). For example, part (b) of FIG. 14 shows that it was determined that a data dependency violation occurred during A3. For example, the arrow emanating from A2 could indicate that at this location within the program, both iterations of the program were about to overwrite the same state variable. Since a data dependency violation has occurred, the method could decide to only use the output of the first iteration (A2) (and/or of the previous iterations A0, A1) to control the control system (S1705). Further, the method halts and restarts the second iteration (S1706). For example, as shown in part (b) FIG. 14, A3 is restarted. Had there been no data dependency violation, the method could have used the output of all iterations (e.g., A2 and A3) to control the control system (S1704). Further, after A3 is restarted, and completes, its output can also be used to control the control system.

Figure 18:
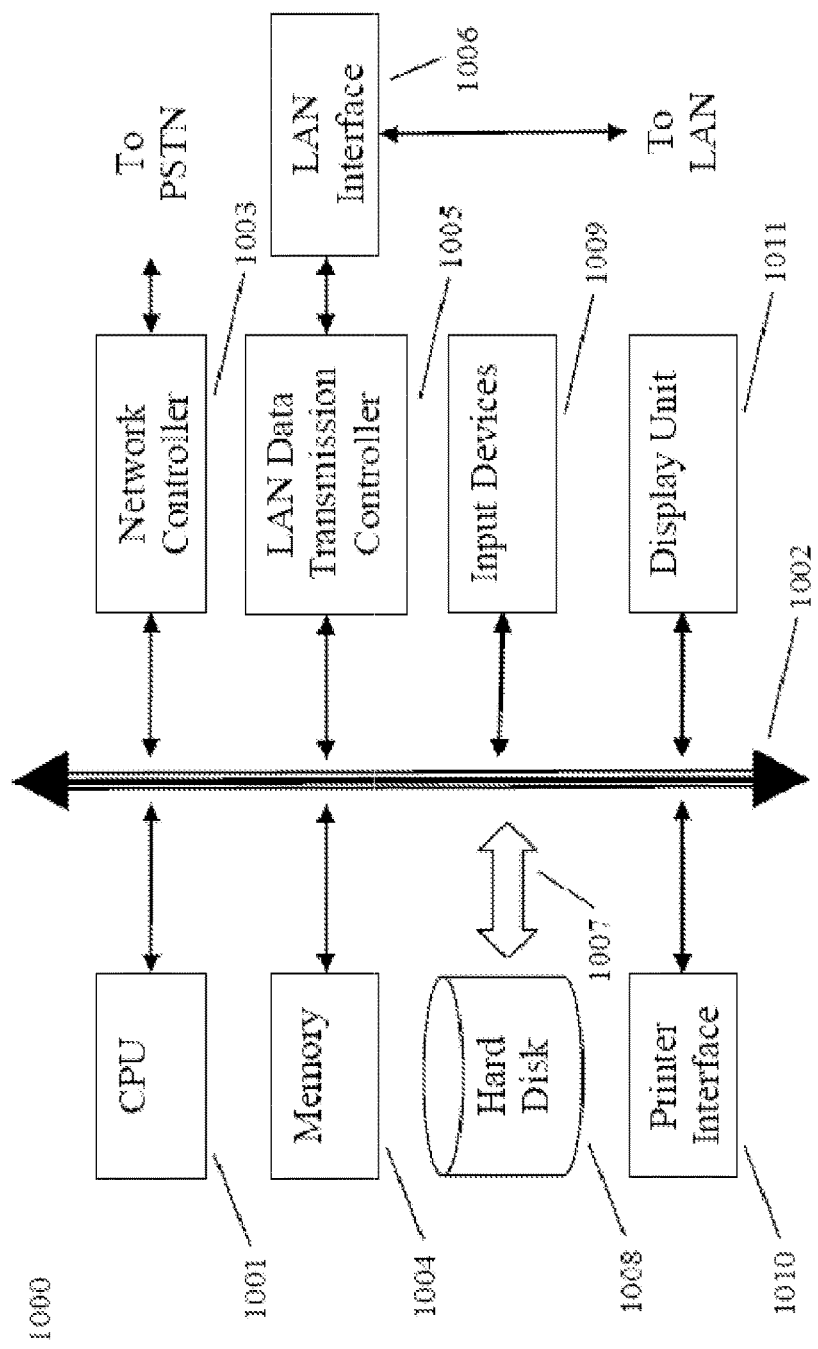
FIG. 18 shows an example of a computer system capable of implementing the methods and systems according to embodiments of the disclosure.

FIG. 18 illustrates an example of a computer system, which may execute any of the above-described methods according to exemplary embodiments of the disclosure. For example, the above-described pipelining strategies and the methods of FIGS. 15-17 may be implemented in the form of a software application or computer program running on the computer system. Examples of the computer system include a mainframe, personal computer (PC), handheld computer, a server, etc. The software application may be stored on a computer readable media (such as hard disk drive memory 1008) locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk 1008, via a link 1007. For example, CPU 1001 may be the computer processor that performs the above described methods.

At least one of the above-described embodiments of the invention, may be used to reduce a scan cycle time or to increase the amount of workload execution of a cyclic control system.

Please note, that while many of the above-described exemplary embodiments of the invention are discussed with respect to 2 Cores, the inventive concept is scalable upwardly to any number of processing cores (e.g., 3, 4, 10, etc.).

What is claimed is:

1. A method of managing a control system, the method comprising:
   in a computer processor of the control system:
   receiving at least one input from at least one sensor associated with the control system to a processing image stored in a shared memory;
   executing a first iteration of a program in a first processing core of a multi-core computer system during a first period, wherein the program reads the at least one input from the shared memory and an output from a prior iteration of the program from the shared memory to generate a new output;

storing the new output to the process image in the shared memory;

controlling an aspect of the control system based on the new output;

receiving new inputs from the at least one sensor and storing the new inputs in the processing image in the shared memory;

executing a second iteration of the program in a second processing core of the multi-core system during a second period that overlaps the first period, the second iteration receiving as input the new output and the new inputs from the processing image in the shared memory; and re-performing the program in the second iteration using the new output from the first iteration and the new inputs from the at least one sensor to produce a new second output;

controlling an aspect of the control system based on the new second output; and wherein read and write operations to the shared memory by the program are atomic and the overlap is determined based on read and write chains of variables associated with the atomic read and write operations.

2. The method of claim 1, wherein during the first iteration, the program performs a calculation on its input to calculate a value and store the value in a variable in the shared memory, and during the second iteration, the program is unable to read the variable until the program during the first iteration has finished storing the value.

3. The method of claim 1, wherein the control system includes a physical sensor that provides the input to the shared memory.

4. The method of claim 1, wherein the control system includes a physical actuator, and the outputs of all of the iterations are used to control the actuator.

5. The method of claim 1, wherein prior to the using, the method further comprises:

executing a third iteration of the program in the first processing core of the multi-core system during a third period after the first period that overlaps the second period.

6. The method of claim 1, wherein prior to the using, the method further comprises:

executing a third iteration of the program in a third processing core of the multi-core system during a third period after the first period that overlaps the second period.

7. A method of managing a control system, the method comprising:

in a computer processor of the control system:

receiving at least one input from at least one sensor associated with the control system to a processing image stored in a shared memory;

executing a first iteration of a first part of a program in a first processing core of a multi-core computer system during a first period, wherein the first part reads as the at least one input to the control system and an output from a prior iteration of the first part from the shared memory to generate a new first output;

storing the new first output in the processing image in the shared memory;

receiving new inputs from the at least one sensor associated with the control system and storing the new inputs in the processing image in the shared memory;

executing a first iteration of a second part of the program in a second processing core of the multi-core system during a second period that overlaps the first period, wherein the second part reads the new inputs and an output from a prior iteration of the second part from the shared memory to generate a new second output;

using the first and second new outputs to control an aspect of the control system by reading the new first output and the new second output from the processing image and applying the outputs to the aspect of the control system, wherein read and write operations to the shared memory by the first and second program parts are atomic and the overlap is determined based on read and write chains of variables associated with the atomic read and write operations.

8. The method of claim 7, further comprising:

executing a second iteration of the first part in the first processing core during a third period after the first period; and executing a second iteration of the second part in the second processing core during a third period after the second period.

* * * * *